United States Patent [19]

Finzel

[11] Patent Number: 4,978,192

[45] Date of Patent: Dec. 18, 1990

[54] RECEPTACLE FOR AT LEAST ONE LIGHT WAVEGUIDE CONNECTOR

[75] Inventor: Lothar Finzel, Munich, Fed. Rep. of Germany

[73] Assignee: Siemens Aktiengesellschaft, Berlin and Munich, Fed. Rep. of Germany

[21] Appl. No.: 371,614

[22] Filed: Jun. 26, 1989

[30] Foreign Application Priority Data

Jul. 6, 1988 [DE] Fed. Rep. of Germany ....... 3822894

[51] Int. Cl.⁵ .............................................. G02B 6/38
[52] U.S. Cl. .............................. 350/96.21; 350/96.20
[58] Field of Search ................ 350/96.20, 96.21, 96.22

[56] References Cited

U.S. PATENT DOCUMENTS

| | | | |
|---|---|---|---|
| 3,919,037 | 11/1975 | Miller | 350/96.21 |
| 4,165,914 | 8/1979 | Villarruel et al. | 350/96.20 X |
| 4,753,509 | 6/1988 | Parstorfer | 350/96.20 |
| 4,756,594 | 7/1988 | Tiberio | 350/96.21 |
| 4,842,362 | 6/1989 | Anderton | 350/96.20 |

FOREIGN PATENT DOCUMENTS 3442429  5/1986  Fed. Rep. of Germany ... 350/96.20 X

*Primary Examiner*—Brian Healy
*Attorney, Agent, or Firm*—Hill, Van Santen, Steadman & Simpson

[57] ABSTRACT

A receptacle for supporting at least one light waveguide connector characterized by the receptacle having a plate-shaped member having grasping jaws for grasping only one end region of the connector so that each connector is grasped only at a single end region. Preferably, the plate member is provided with depressions adjacent the free end of each connector so that the connector can be removed from the jaws by pushing on the free end to pivot the connector to pop the grasped end from the jaws.

16 Claims, 2 Drawing Sheets

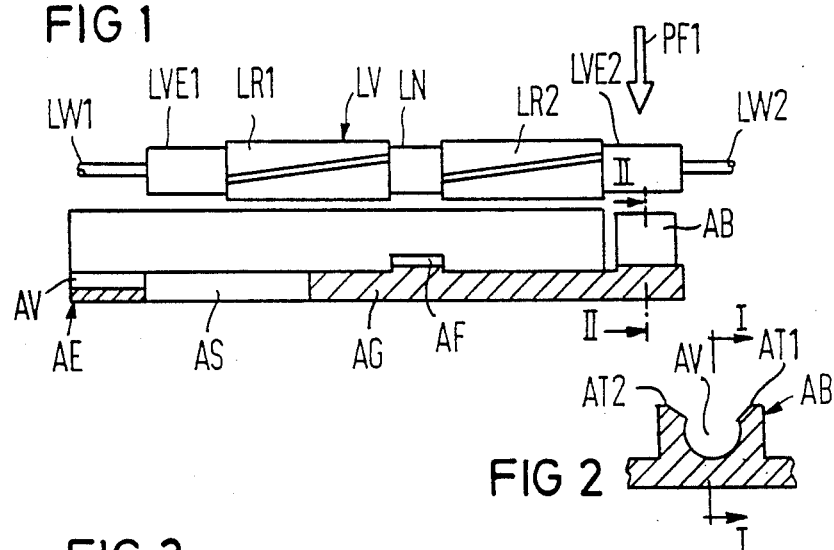
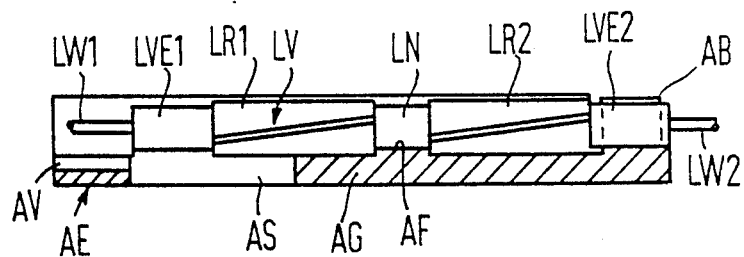
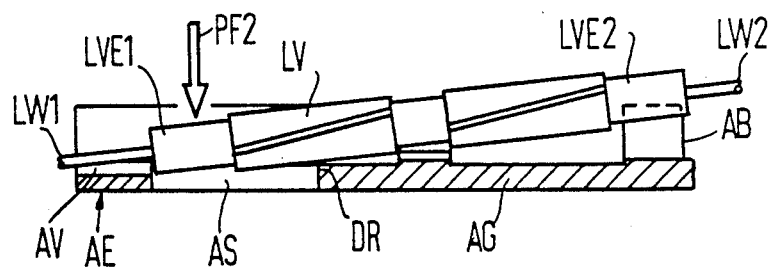

RECEPTACLE FOR AT LEAST ONE LIGHT WAVEGUIDE CONNECTOR

BACKGROUND OF THE INVENTION

The present invention is directed to a receptacle for at least one light waveguide connector, wherein the light waveguide connector has only one of its end regions held in a latched or engaged position in the receptacle.

A receptacle for a spliced element of light waveguides, wherein the individual spliced elements are arranged in two rows, namely with the splice elements of one row lying offset relative to the splice elements of the other row, is disclosed in published German application OS No. 34 42 429. An improved utilization of space is guaranteed in this arrangement and also provides a good surveyability at the same time.

A receptacle for a splice connection of a light waveguide, wherein the actual splice connectors are held in guide channels over their full length is disclosed in U.S. Pat. No. 4,753,509, whose disclosure is incorporated by reference and which was based on German application No. 35 39 707. Such an arrangement has the disadvantage that when subsequent modifications, repairs or the like are necessary, the access to these splice connectors is very difficult.

SUMMARY OF THE INVENTION

The present invention is based on the object of providing a receptacle for at least one light waveguide connector, wherein the light waveguide connectors are always easily accessible and, moreover, can be, again, removed from the receptacle easily at any time. This is inventively achieved in a receptacle device for at least one light waveguide connector, which light waveguide connector has two end regions, said receptacle comprising a member having means for grasping only one end region of the connector. It thereby becomes possible, in a simple way, to grasp light waveguide connectors at their respective free ends, for example by hand, and to remove it from the single-end engagement with a tilting motion. The release of the light waveguide connector occurs with a defined pressure on the non-mounted end. The mounted end of the light waveguide connector disengages from the means for grasping and the connector can then be removed.

The pressure required for the release can be generated with a simple tool, such as, for example, a screwdriver. Pressure with the thumb or with the finger tip, however, is completely adequate.

The solution of the invention is adequately vibration-proof, because the grasping means provides an engaging mount in only the one end region. Each of the light waveguide connectors can be introduced or removed by itself so that good classification is guaranteed for the overall arrangement. Special tools are not required and very space-saving structures occur overall that enable the receptacle to be accommodated into all standard splicing cassettes or sleeves.

Other advantages and features of the invention will be readily apparent from the following description of the preferred embodiment, the Figures and claims.

BRIEF DESCRIPTION OF THE DRAWINGS

FIG. 1 is a cross sectional view taken along the line I—I of FIG. 2, with the light waveguide connector being introduced into the receptacle in accordance with the present invention;

FIG. 2 is a cross sectional view taken along the lines II—II of FIG. 1;

FIG. 3 is a cross sectional view similar to FIG. 1, with the light waveguide connector being completely assembled in the receptacle;

FIG. 4 is a cross sectional view similar to FIGS. 1 and 3, with the first step removing the light waveguide connector from the receptacle of the present invention;

DESCRIPTION OF THE PREFERRED EMBODIMENTS

Figures 5, 7:
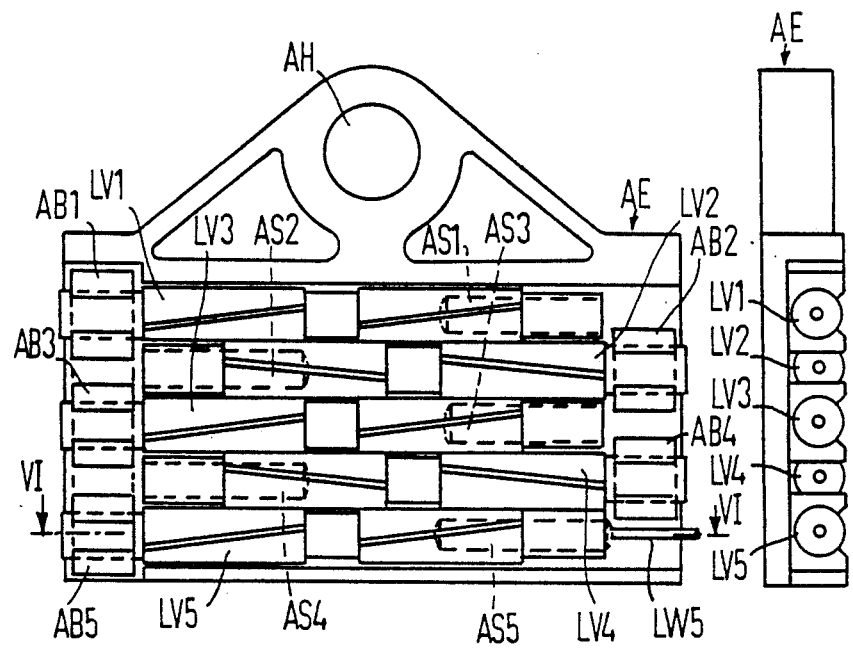
FIG. 5 is a plan view of a structure of a receptacle for receiving a plurality of light waveguide connectors in accordance with the present invention.
FIG. 7 is an end view taken from the left-hand end of the receptacle of FIG. 5.

The principles of the present invention are particularly useful in a receptacle, generally indicated at AE in FIGS. 1-4. The receptacle AE is preferably composed of a plastic material, for example a polycarbonate +20% glass fibers, which plastic material is sold under the tradename "Makrolan". The receptacle of FIGS. 1-4 is composed of a base plate AG and grasping means which are formed by laterally arranged retaining or clamping jaws AB. The clamping jaws AB are shown in FIG. 2 and include two lateral webs AT1 and AT2, which have a depression AV therebetween. The depression AV has a curved segment which is more than a semicircle, or 180°, and, as illustrated, is approximately 220°-250° and forms nose-like projections for engaging a cylindrical object placed therein.

The receptacle AE is constructed for receiving and grasping a light waveguide connector LV. The light waveguide connector LV has, essentially, a cylindrical shape with two end regions LVE1 and LVE2. The connector is formed of several parts which are held together by annular springs LR1 and LR2, which, as illustrated, are arranged on the connector so as to separate each of the cylindrical end regions LVE1 and LVE2, respectively, from a center region LN. The light waveguides LW1 and LW2 extend out of two end faces of the light waveguide connector LV and have their ends coupled in the middle in a suitable way. Such a light waveguide connector LV is a splice connection and represents a relatively rigid structure and the object is to secure this structure to the receptacle AE in a suitable way. In detail, this fastening or, respectively, mounting occurs in that the light waveguide connector LV has only one of its end regions, such as the end region LVE2 in the present example, introduced in a latching fashion into the elastically fashioned retaining jaws AB of the engaging or grasping means of the receptacle. This type of fastening is executed with a force of pressure in accordance with the arrow PF1, which suffices completely for an adequate arrest of the light waveguide connector LV given a correspondingly tight seat being inside the retaining jaw AB.

In the completely assembled condition, the light waveguide connector LV assumes the position shown in FIG. 3, whereby the right-hand end region LVE2 is held by the latching means or grasping means formed by the retaining jaws AB. An additional securing for the deposit of the light waveguide connector LV can occur in that the light waveguide connector, at least in the sub-region thereof, also rests on the base plate AG of the receptacle AE. In the present case, this is guaranteed in that the annular springs LR2 and a part of the annular spring LR1 lie against the base plate AG. An additional securing can be achieved in that a guide AF with a shallow U-shaped depression is provided and the depression engages a cylindrical portion LN that is formed between the two springs LR1 and LR2.

In order to repair the light waveguide connector or for classification purposes, it is desirable to be able to detach the light waveguide connector LV from the receptacle AE. Since the mounting of the light waveguide connector LV occurs only at one end, such as the end LVE2, with the retaining jaws AB, the removal is always possible in a simple way and without causing an undesirable deformation of, for example, the receptacle AE that would result in an unfavorable influencing of the remaining light waveguide connectors that are likewise still present in the receptacle. As shown in FIG. 4, a radial force merely has to be exerted at the free end LVE1 of the light waveguide connector LV in order to release the light waveguide connector LV from the clamping jaws AB. In order to enable a simple detachment, even given a compact structure, wherein lateral accessibility of the light waveguide connectors arranged in tight juxtaposition is not established, a depression or opening AS, which is in the form of a gullet or a cut-out, is provided in the base plate AG. This depression AS is dimensioned such that a large region of the free end LVE1 of the light waveguide connector can dip into the opening. For detaching, it is sufficient to exert a radial force corresponding to the arrow PF2 in the region LVE1 of the light waveguide connector LV. As a result of this force, the right-hand end LVE2 of the light waveguide connector LV is popped out or removed from the jaws AB, due to a lever action, namely via the pivot point DR at the right-hand edge of the aperture AS. In order to assure that no damage to the light waveguide LW1 has occurred in the region of the left-hand end LVE1 of the light waveguide, the base plate AG can have the bottom surface correspondingly lowered or depressed in the region AV or can be entirely recessed. Otherwise, a deformation or potential damage to the light waveguide LW1 could occur at the left-hand edge of the cut-out AS.

Figure 6:
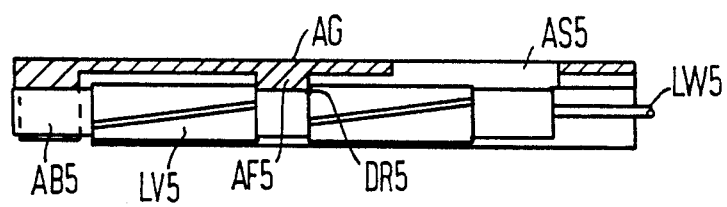
FIG. 6 is a cross sectional view with portions in elevation taken along the lines VI—VI of FIG. 5.

As illustrated in FIGS. 5–7, the receptacle AE is constructed in the form of a large splice cassette that is provided with a corresponding fitting strip or fastener and can be accommodated and held by the latter, for example a splice housing, a sleeve or the like. For example, a total of 5 light waveguide connectors LV1-LV5 are accommodated in the receptacle AE and these are arranged mesh-like at the light waveguide connectors LV1, LV3 and LV5 are held in corresponding retaining jaws AB1, AB3 and AB5 at the left-hand end of the receptacle. Two additional light waveguide connectors LV2 and LV4 are provided and spaced relative to these three light waveguide connectors LV1, LV3 and LV5, and these two additional light waveguide connectors LV2 and LV4 are held in corresponding retaining jaws AB2 and AB4, which are on the right-hand end of the receptacle AE. Thus, adjacent connectors will be grasped at different ends by the receptacle AE. The receptacle AE has depressions AS1-AS5, which are positioned along the side opposite the respective grasping means formed by the jaws, such as AB. These depressions are illustrated as cut-outs AS1-AS5 and are selected to be smaller in width than the outside diameter of the corresponding light waveguide connector in this sub-region so that it is assured that the light waveguide, such as LW5 (see FIG. 6), will not be pressed down and damaged when removing the light waveguide connector LV5 from the gripping means formed by the jaws AB5. The individual light waveguide connectors LV1-LV5 are laterally supported directly against one another and are, thus, held in an especially vibration-proof manner. In addition, the connectors are also gripped in a center region by a member, such as AF5 gripping a center portion of the waveguide connector LV5.

The releasing of the light waveguide connector LV is also possible in that the respective seat is fashioned so high that the light waveguide connector LV no longer rests on the base plate AG and the seating web formed in this fashion forms the pivot point analogous to the point DR in FIG. 4. Details regarding this must be seen from FIG. 6, wherein the seat AF5 situated roughly in the middle region forms an elevated web so that the light waveguide connector LV5 now rests on the base plate AG only there. When the light waveguide connector LV5 is pressed inward, it is tilted around the pivot point DR5 formed by this seat AF5 and is thereby released from the engaging means formed by the jaws AB5 as a consequence of the lever action.

Although various minor modifications may be suggested by those versed in the art, it should be understood that I wish to embody within the scope of the patent granted hereon all such modifications as reasonably and properly come within the scope of my contribution to the art.

I claim:

1. A receptacle for at least one light waveguide connector, said receptacle having a member being provided with means for grasping only one end of the light waveguide connector and, said member having support means for supporting and engaging a sub-region of the light waveguide connector spaced from the one end held in the means for grasping, said sub-region being approximately a middle region of the light waveguide connector.

2. A receptacle according to claim 1, wherein the member has a depression in the region of a free end of the light waveguide connector.

3. A receptacle according to claim 2, wherein the support means forms a pivot point for the light waveguide connector.

4. A receptacle according to claim 1, wherein the member has a plurality of grasping means arranged along each end with the grasping means of one end being offset relative to the grasping means of the other end so that adjacent light waveguide connectors are grasped at opposite ends.

5. A receptacle according to claim 4, wherein each of the grasping means is positioned on the member so that adjacent light waveguide connectors are laterally supported directly against one another.

6. A receptacle for holding a plurality of light waveguide connectors, said receptacle including a member having grasping means for grasping an end region of each light waveguide connector to hold said light waveguide connectors in a substantially parallel arrangement on said member, said member opposite each grasping means having a depression underlying a free end of the light waveguide connector held by the grasping means and said member having means for forming a pivot point for the light waveguide connector to be pivoted on during removal from said grasping means.

7. A receptacle according to claim 6, wherein said member has a recess forming the depression and the edge of the recess forms the pivot point.

8. A receptacle according to claim 6, wherein the member has a support means for supporting a middle portion of each light waveguide connector associated with each grasping means, said support means forming said pivot point for said light waveguide connector.

9. A receptacle according to claim 8, wherein said member includes an aperture forming said depression aligned with each grasping means.

10. A receptacle according to claim 9, wherein each of the apertures has a size less than the total width of the connector so that the connector cannot be moved into the recess a sufficient distance to damage a light waveguide supported by the connector.

11. A receptacle according to claim 6, wherein the member has grasping means disposed along each end of the member, with the grasping means along one end grasping alternate light waveguide connectors.

12. A receptacle according to claim 11, wherein the spacing between the grasping means is greater than the length of the connectors so that the adjacent connectors have contact with each other.

13. A receptacle according to claim 11, wherein said means for forming a pivot point forms support means for each of said connectors for engaging a middle portion of the connector.

14. A receptacle according to claim 1, wherein said means for grasping includes elastically deformable retaining jaws and said connector being arrested in a latching fashion by said jaws.

15. A receptacle according to claim 11, wherein each depression is formed by an aperture.

16. A receptacle according to claim 15, wherein each means for forming a pivot point provides support means positioned to support a center region of the connector.

* * * * *